(12) United States Patent
Gates et al.

(10) Patent No.: US 8,025,503 B2
(45) Date of Patent: Sep. 27, 2011

(54) ONE-ENGINE-INOPERATIVE TRAINING METHOD AND SYSTEM

(75) Inventors: Patrick Joseph Gates, Ottawa (CA); Teuvo Saario, Blainville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1033 days.

(21) Appl. No.: 10/958,742

(22) Filed: Dec. 8, 2003

(65) Prior Publication Data

US 2005/0234689 A1 Oct. 20, 2005

(51) Int. Cl.
*G09B 9/08* (2006.01)

(52) U.S. Cl. .................. 434/35; 434/33; 701/3

(58) Field of Classification Search .............. 434/29, 434/33, 35, 49–51, 66; 244/17.13, 175; 349/515
See application file for complete search history.

(56) References Cited

U.S. PATENT DOCUMENTS

| | | |
|---|---|---|
| 2,798,308 A | 7/1957 | Stern et al. |
| 2,824,388 A | 2/1958 | Stern et al. |
| 2,882,615 A | 4/1959 | Dawson, Jr. |
| 2,933,828 A | 4/1960 | D'Amico |
| 2,940,181 A | 6/1960 | Lem |
| 2,987,829 A | 6/1961 | Dawson, Jr. et al. |
| 3,011,268 A | 12/1961 | Guilloud |
| 3,012,338 A | 12/1961 | Atchison et al. |
| 3,015,894 A | 1/1962 | Simpson et al. |
| RE25,325 E | 1/1963 | Goodwin |
| 4,478,038 A | 10/1984 | Cropper et al. |
| 4,537,025 A | 8/1985 | Cropper et al. |
| 4,673,356 A | 6/1987 | Schmidt |
| 4,831,567 A | 5/1989 | Lea |
| 5,363,317 A | 11/1994 | Rice et al. |
| 5,403,155 A * | 4/1995 | Head et al. .............. 416/25 |
| 5,873,546 A | 2/1999 | Evans et al. |
| 5,948,023 A | 9/1999 | Evans et al. |
| 6,053,737 A | 4/2000 | Babbitt et al. |
| 6,917,908 B2 * | 7/2005 | Williams .............. 703/8 |
| 2002/0133322 A1 | 9/2002 | Williams |

OTHER PUBLICATIONS

Sikorsky 76 Flight Manual—SA 4047-76c-10—Part 2, Section I Description—p. 1-8E; Section V Supplemental Performance Data—pp. 5-44 through 5-47, Revised Sep. 30, 1999.

* cited by examiner

*Primary Examiner* — Xuan M Thai
*Assistant Examiner* — Timothy Musselman
(74) *Attorney, Agent, or Firm* — Bachman & LaPointe, P.C.

(57) ABSTRACT

A method and system of simulating one-engine-inoperative (OEI) conditions in a multi-engine single-output aircraft which involves the operation of the engines above non-zero power settings, and operating each relative to one another to simulate power loss experienced during an actual failure of at least one engine.

25 Claims, 3 Drawing Sheets

ONE-ENGINE-INOPERATIVE TRAINING METHOD AND SYSTEM

FIELD OF THE INVENTION

The present invention relates to a method and system for training pilots in the operation of a helicopter under emergency operating conditions, and more specifically to a method for conducting one-engine-inoperative (OEI) flight procedures training in a twin-engine helicopter.

BACKGROUND OF THE INVENTION

Many of the helicopters being operated today embody a twin-engine power plant system which not only enhances the normal flight capabilities of a helicopter but also provides sufficient power to facilitate continued flight operations in safety under emergency conditions, such as in the event of a one-engine-inoperative (OEI) condition, e.g. a single engine failure.

The power plant in a modern helicopter is typically a gas turbine engine which usually operates within a normal rated power output range. Such engines are capable of producing power at a level significantly above the normal rated power range, however operation in this elevated power output range greatly reduces the life expectancy of certain critical components such as the turbine blade, etc. Operation of a twin-engine helicopter in a OEI event necessitates relaxing of normal engine control criteria and allows the helicopter operator to demand and receive power from the remaining operating engine at levels in excess of the normal operating range. The shift in control logic is justified in such emergency situations for obvious safety reasons.

The training of helicopter pilots for engine failure operation has long caused problems for instructors and helicopter operators. The objective of initial pilot certification and pilot referential training is to ensure that pilots achieve and maintain a high degree of proficiency in all aspects of helicopter flight operations, including emergency procedures such as OEI flight operations. Such proficiency is typically achieved by repetitive training conducted under actual flight conditions, e.g. actual flight envelopes, actual gross weights (based on pressure altitude and ambient temperature), actual power settings, and actual cockpit instrument displays. Realistic training in OEI flight operations conventionally requires the pilot to temporarily disable the fuel control on one engine, reducing it to an idle condition effectively with a zero power output, and then operate the other engine within its elevated emergency rated power range. As noted above, such emergency power operation shortens the life expectancy of the engine, thereby increasing the frequency of extensive maintenance.

Helicopter gas turbine engines are rated by manufacturers and regulatory agencies for each permitted mode of operation. The rating of an engine establishes allowable time limits for operation at various power levels. Such levels may range from continuous at a normal or part-throttle levels, to the higher emergency power levels under certain time limits, such as 30 second/2 minute and/or 2.5 minute ratings. One factor in determining a one-time emergency limited rating for an engine, is the frequency with which the engine is expected to deliver such elevated levels of power. The realistic flight training method discussed above requires repeated use of emergency power during training exercises, resulting in a lower power level than would be allowable for a one-time actual emergency use.

An alternative commonly used within the industry is to reduce the weight of the helicopter to a minimum, and to operate the one engine at a flight idle power level with the other engine being controlled within its normal operating range. The cockpit displays are however, biased to indicate simulated maximum emergency power ratings, based on the weight biasing factor, in order to simulate the dynamics of an aircraft in a fully loaded condition. One example of this type of training method is disclosed in U.S. Pat. No. 5,873,546, issued to Evans et al. on Feb. 23, 1999.

One disadvantage of the prior art training methods results from operation of the helicopter with one engine in an idle condition. Should for any reason the power producing engine experience an unplanned failure, requiring the idling engine to be brought up to a full power state, the helicopter would experience a period of time in which the total available power is extremely low, thereby restricting maneuverability and possibly resulting in operating outside of safety margins.

Another conventional approach involves conducting OEI flight procedures training, utilizing both engines operating at an intermediate power output rating. In this approach, each engine is operated at a reduced power rating so that both engines in combination provide a power output at the intermediate power output rating that is equivalent to the power output provided by a single operative engine operating under a maximum emergency power rating. One example of this approach is disclosed in U.S. Pat. No. 4,831,567, issued to Lea on May 16, 1989 and assigned to the same assignee as this application.

Nevertheless, further an improved OEI training method is desirable to simulate an actual OEI situation.

SUMMARY OF THE INVENTION

One object of the present invention is to provide a method of simulating a one-engine-inoperative (OEI) condition in a twin-engine helicopter for pilot training procedures.

In accordance with one aspect of the present invention, there is provided a method of simulating a one-engine-inoperative (OEI) condition in a multi-engine single-output helicopter having at least first and second engines, the method comprising the steps of operating the first and second engines at a selected operational power level, commencing an OEI simulation by reducing the power level of the first and second engines to respective non-zero power levels, and then accelerating the first and second engines from their respective non-zero power levels in a manner to simulate a output power transient occurring in an actual OEI situation.

In accordance with another aspect of the present invention, there is provided a method of simulating a one-engine-inoperative (OEI) condition in a multi-engine helicopter, the method comprising the steps of: providing a OEI training program in control system such that the control system is adapted to control the engines in an engine operation mode and in an OEI training mode; and providing a selector for selection of mode to allow the control system to control at least first and second engines at least in accordance with the following steps: reducing a power level of the each of the first and second engines from respective operational power settings to a non-zero power settings, and then accelerating the first and second engines from their respective non-zero power settings to simulate a power transient which would occur in an actual OEI situation.

In accordance with a further aspect of the present invention, there is a method of simulating a one-engine-inoperative (OEI) condition in a twin-engine helicopter, the method comprising the steps of substantially simultaneously decelerating first and second engines from respective engine operation power settings, terminating the deceleration of the first engine at a first non-zero power setting, terminating the deceleration of the second engine at a second non-zero power setting which is lower than the first non-zero power setting, accelerating the first engine, immediately after the first engine reaches the first non-zero power setting, until the first engine reaches a predetermined power setting, accelerating the second engine, immediately after the second engine reaches the second non-zero power setting, until the second engine reaches the predetermined power level, wherein the acceleration of at least one of the engines is adjusted in a manner adapted to simulate a power transient caused by a failure of one engine and an emergency acceleration of the other engine in an actual OEI situation.

In accordance with a further aspect of the present invention, there is a method of simulating a one-engine-inoperative (OEI) condition in a twin-engine helicopter including at least first and second engines, comprising steps of simulating an OEI condition by operating the first and second engines both in non-zero power settings, and biasing a cockpit indicator relating to at least a parameter of the first engine to show a combined indication of the parameter for both engines to thereby simulate the appearance of said display as if only the first engine is operating.

In accordance with a further aspect of the present invention, there is a method of simulating a one-engine-inoperative (OEI) condition in a multi-engine helicopter, comprising a step of displaying an engine expiry flag in a cockpit indicator to simulate an expiry of time allowance for a maximum OEI power when the twin-engine helicopter is operated in an OEI training mode.

The present invention advantageously provides a simulation of the power loss encountered during an actual engine operation transition from a normal engine operation situation in which all engines are operating (AEO), to a OEI situation. During an actual OEI occurrence, the power provided by the affected engine is assumed to be lost within one second. In this rare event, the total power is instantly reduced, even though the remaining running engine has almost instantaneously started to accelerate and provide additional power to a maximum OEI setting in order to compensate for the power provided by the lost engine. In the OEI training mode of the present invention, this transient total power lost is simulated by decelerating both engines because the maximum deceleration rate of one engine is insufficient to simulate the transient power loss in the actual situation. The end result is that the pilots in training experience the same rotor droop characteristics as those experienced in an actual OEI situation.

The training method and system of the present invention also permits the training of pilots with the maximum allowable helicopter weight, because the two engines in the OEI simulation provide the same power as a single engine in an actual OEI situation, without the engine deterioration incurred by an engine operating in a single engine mode at a higher emergency power setting. This also provides a more realistic experience to the pilot in training, because the acceleration capability of the engine varies with the power level, and thus by training at a higher power level, the pilots get a real feeling of how quickly the engine power comes on.

Other features and advantages of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 1:
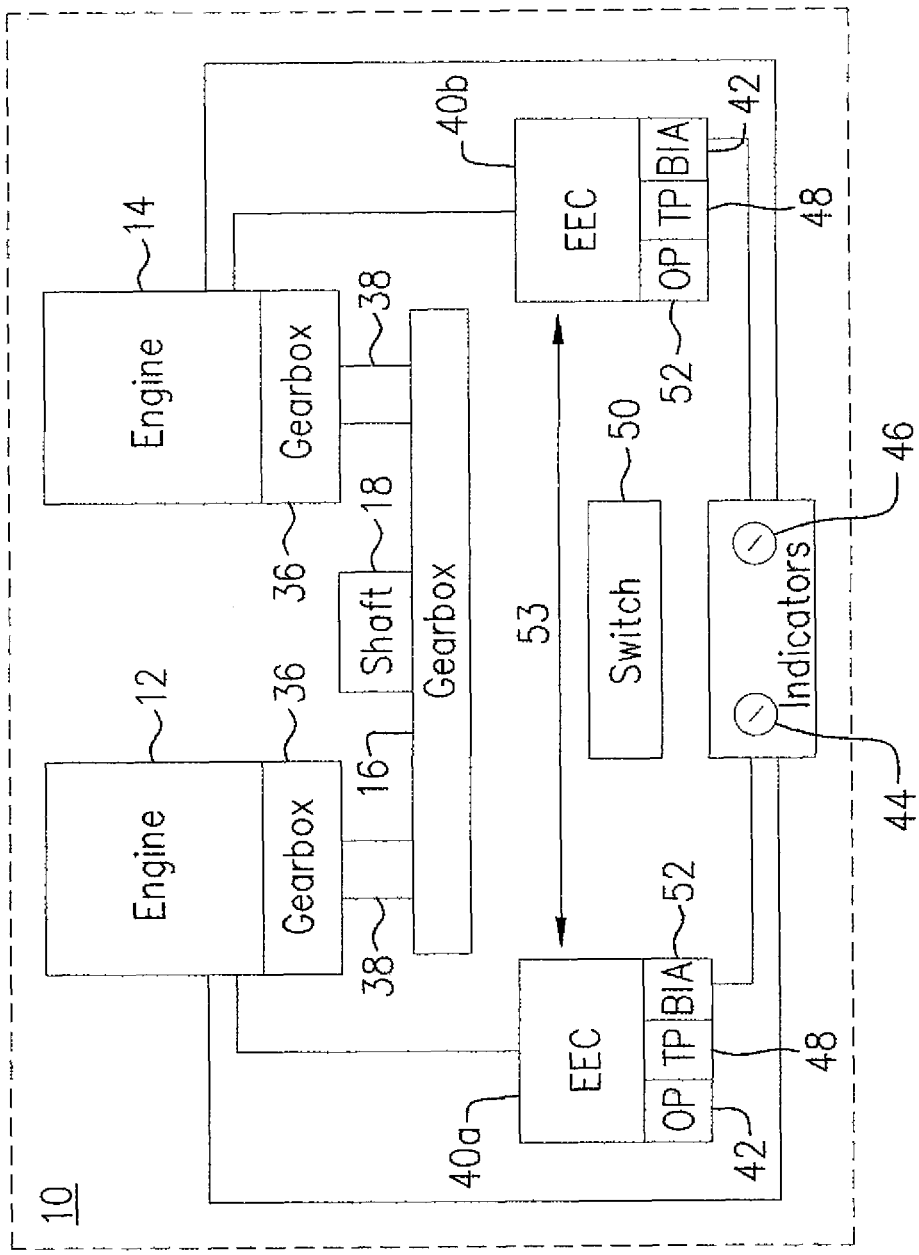
FIG. 1 is a schematic illustration of a twin-engine single-output power plant system of a helicopter incorporating a one-engine-inoperative (OEI) operation mode according to the present invention.

FIG. 1 illustrates a twin-engine single-output power plant system for a helicopter, generally indicated at numeral 10. The twin-engine power plant system 10 includes first and second turbo shaft gas turbine engines 12 and 14 which are mechanically linked by gearbox 16, to provide a single output at the main shaft 18. It is to be understood that the single combined power output is represented by a shaft output means, including electrical, hydraulic, mechanical, etc., all driven by the combined output of the mechanically linked engines. Likewise, for a helicopter having multiple engines, the gearbox may supply shaft power to both the main rotor and the tail rotor rather than to a single shaft the output of which is then divided among the components.

Engines 12 and 14 are preferably identical. Each engine preferably has a gearbox 36 to generate engine torque output on an output shaft 38 of the gearbox 36 for transfer to gearbox 16.

The power output of a gas turbine engine is typically related to the flow of fuel to its combustor section, with the actual power being limited by the high temperature endurance of the engine components immediately downstream of the combustor. The fuel flow and hence the turbine inlet temperature, are restricted to a rate which will permit the pilot to receive normal rated "full" power output for an extended period of time during a normal flight operation. Those restrictions for each engine 12, 14 are controlled by an appropriate electronic engine controller (EEC) 40 (shown as EEC 40a and 4h, respectively) according to an engine operation program 42 installed in a memory or other computer-readable medium of the EEC. EECs 40 communicate 53 with each other in a known manner to thereby provide an overall control system for the twin-engine system. The engine operation parameters are displayed by cockpit indicators 44 and 46 relating to the respective engines 12 and 14. The cockpit indicators 44, 46 display engine torque provided by the output shaft 38 of each engine; rotational speed of the compressor impeller and the compressor turbine (sometimes referred to as NG or N1); the rotational speed of the power turbine (sometimes referred to as NPT or N2); the gas temperature between the compressor turbine and the power turbine (mean gas temperature, or MGT, or interturbine temperature, or ITT); etc.

During one-engine-inoperative situations, it is frequently advantageous for the pilot to have the ability to receive power output in excess of the normal rated fuel output power from the remaining operative engine(s). Aviation regulatory authorities have therefore established general over design criteria for the power plant system of a twin-engine helicopter in order to ensure that the helicopter can be safely operated utilizing a single operative engine during OEI flight operations. These criteria have resulted in the over design of the engines comprising the helicopter power plant system so that a single operative engine is capable of providing at least a 30-second/2-minute OEI power rating, a 2.5-minute OEI power rating and a maximum continuous OEI power rating that ensure safe helicopter flight operations during OEI flight operations. Operation of a gas turbine engine in excess of the normal rated power output as stated above does reduce the life expectancy of certain engine components and thus the time between engine overhauls. Therefore, a training method is developed according to the present invention to simulate an engine OEI situation while operating the engines at normal rated power settings.

Figure 2:
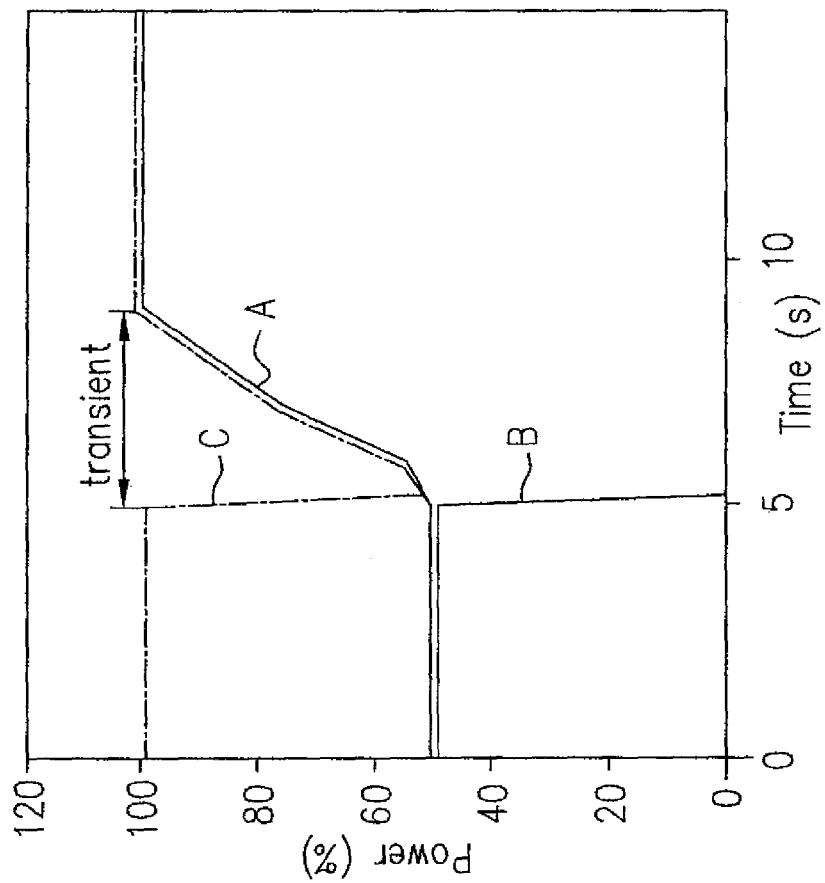
FIG. 2 is a graphical representation illustrating a transient of a total power output of a twin-engine power plant system of a helicopter during an actual OEI occurrence.

Referring now to FIGS. 1 and 2, during normal operation each of the engines 12, 14 provides 50 percent of the total power required to fly the helicopter at a selected power setting, each of the engines 12, 14 being operated below but close to its maximum power level for continuous operation. When one engine, for example engine 14, fails, the power output level represented by solid line B in FIG. 2, almost instantly drops to zero. The communicating 53 EECs 40 detect the failure of the engine and power demand signals are sent, according to the engine operation program 42, to engine 12, causing engine to be substantially simultaneously accelerated at OEI settings, to eventually provide the same output power level (100 percent) represented by solid line A, or a total output power level less than 100 percent, whereby a safe flight operation of the helicopter can be maintained. The total power output level of the twin-engine power plant system 10, represented by broken line C, includes a transient which results from a time lag between the instant power loss of engine 14 and the compensating power increase of engine 12. An actual curve shape of the transient in the total output power level, illustrated by representative broken line C, will depend on the make of helicopter, the engines, etc.

Figure 3:
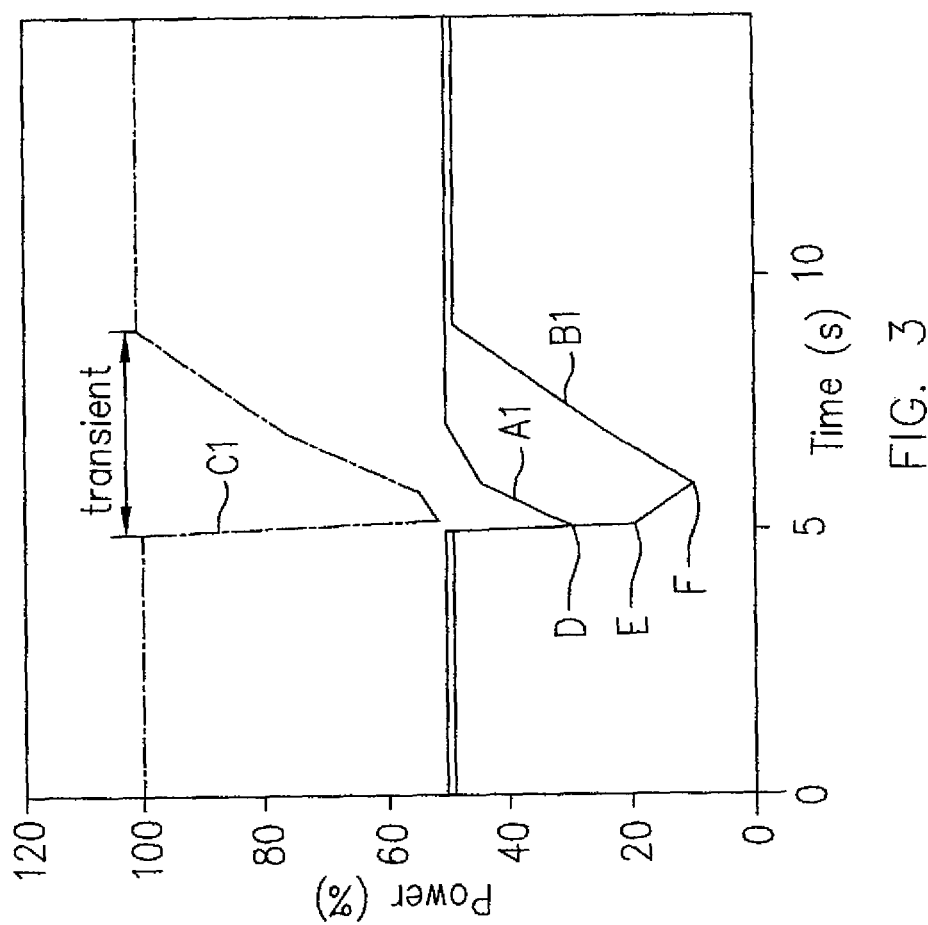
FIG. 3 is a graphical representation illustrating a total power output of a twin-engine power plant of a helicopter in the OEI training mode of the present invention, simulating an actual OEI occurrence.

Referring to FIGS. 1 and 3, the twin-engine power plant system 10 further includes an OEI training program 48 installed in a memory or other computer-readable medium of the EECs 40 and a mode selection switch 50 connected to EECs 40. Actuating the mode selection switch 50 will enable the EECs 40 to switch the power plant system operation between a normal engine operation mode including operation procedures during an actual OEI occurrence according to the engine operation program 42, and OEI training mode according the OEI training program 48, in order to simulate an OEI situation while operating both engines 12, 14 under normal operation conditions. OEI training program 48 is designed to enable the EECs 40 to control the respective engines 12, 14, in order to provide output power levels A1, B1 as illustrated, in a manner such that the sum of the output power levels A1 and B1, indicated by C1, is equivalent to the total output power level C, of an actual OEI occurrence as illustrated in FIG. 2, while both output power levels A1 and B1 are maintained at non-zero power settings, i.e., neither one of the engines 12, 14 is operating at an idle condition. It is understood that the mode selection switch 50 may not necessarily be a mechanical or electric "switch", per se, but rather may be suitable control logic. Preferably, an interface is provided allowing the pilot (or others) to manually initiate the OEI training mode, or return to the engine operation mode, as the case may be.

During the course of a normal flight in which engines 12 and 14 are operated at a selected operational power setting, the mode selection switch 50 can actuated (e.g. by the pilot) to commence an OEI simulation. The simulation decelerates both engines and then, in the example of FIG. 3, re-accelerates one engine slower than the other, eventually bringing both engines back to 50% of total power. In a more detailed description. the simulation of FIG. 3 (and the simulated transient, in particular) commences by a reduction of the power levels A1 and B1 of the respective engines 12; and 14 to a non-zero power setting. It is preferable to reduce the power level A1 of the engine 12 to a first non-zero power setting to simulate an operative-engine in an actual OEI situation, and instantly reduce the power level B1 of engine 14 to a second non-zero power setting to simulate an inoperative engine in the actual OEI situation. The first non-zero power setting of engine 12 is preferably higher than the second non-zero power setting of engine 14, as shown in FIG. 3. Therefore, the deceleration rate of engine 14 is more rapid than the deceleration of engine 12. (The first non-zero power setting is indicated by D and the second non-zero power setting is indicated by E.)

In accordance with the OEI training program 48, the EECs 40 accelerate the engine 12 from the first non-zero power setting D at a selected acceleration rate and accelerate the engine 14 from the second non-zero power setting E at different selected acceleration rate such that the sum of the power levels A1 and B1 results in the power transient included in the combined total power level C1, which reflects a simulated major temporary power loss during a lag between a failure of one engine and an emergency acceleration of the other engine, as occurs in an actual OEI situation. In order to more realistically simulate the power transient of the total power output level C of FIG. 2 in which an inoperative engine instantaneously accelerates to an OEI power setting, the OEI training program 48 is designed to enable the EECs 40 to adjust the selected acceleration rate of the respective engines 12, 14 as illustrated in the rising section of the power level A1, which includes two sections representing different power acceleration rates. More specifically, OEI training program 48 can be designed to enable the EECs 40 to operate engine 14 in a manner such that, from the second non-zero power setting E, engine 14 further decelerates at a deceleration rate much slower than the original deceleration rate, to a further non-zero power setting indicated by F, and then from there accelerates at a selected acceleration rate, as illustrated by the power level B1 in FIG. 3. The deceleration and acceleration rates can be selected and adjusted in various ways such that the transient of the combined power output level C1 realistically simulates the transient of the total power output level C of FIG. 2. The illustrated power output levels A1 and B1 of the respective engines 12, 14 are one example of the OEI training procedures of the respective engine operations.

In FIG. 3, the respective power output levels A1, B1, restore the original power level (50 percent of the total power) and thus maintain the total power at the 100 percent level after the transient. Thus, neither one of the engines 12, 14 is operated in excess of their normal operating settings during the OEI training course. OEI training program 48 can also be designed to enable the EEC 40 to control the respective engines 12, 14 to operate at a power output level lower than their continuous maximum power level, that is, less than 50 percent of the total power output level of the twin-engine power plant system 10, in order to simulate an OEI situation in which the total power output of the twin-engine power plant system 10 during an actual OEI event is less than a normal 100 percent power level for the helicopter flight, as described in the prior art patent, U.S. Pat. No. 4,831,567.

In one embodiment of the present invention, OEI training program 48 is designed to enable the EECs 40 to substantially simultaneously decelerate the engine 14 at a minimum fuel flow rate for one second and reduce the torque output of engine 12 at a 5 percent per second rate for the first second when the OEI training mode is commenced. After the first second, the EEC 40*b* limits the deceleration of engine 14 to a predetermined rate, depending on whether or not the engine 12 is on a limiting loop, which can be displayed by the cockpit indicator 46, either as engine operation parameters NG and MGT or engine operation parameter torque. At the same time, engine 12 is controlled by the EEC 40*a* to accelerate freely. It should be noted that the accelerating of the respective engines 12, 14 are conducted in accordance with the equally reduced acceleration limiting maps of the both engines such that the total power increase of the two engines matches the power increase of one single engine. An acceleration map is a schedule which determines when and how the engine will be accelerated under certain predetermined conditions. Acceleration limiting maps are used for surge protection in normal operation, but also determine how quickly power is allowed to increase. In this embodiment the deceleration and acceleration rates and the resultant power drops of the entire twin-engine power plant system 10, are tailored on a model to match engine failure in an OEI situation.

Furthermore, means 52 for biasing the display of the cockpit indicators 44, 46 are provided with the EEC 40. Thus, when the OEI training mode is selected, the displays of the respective cockpit indicators 44, 46 are biased to simulate the displays of the cockpit indicators of a helicopter in an actual OEI situation. In particular, the cockpit indicator 46 which relates to engine 14 simulating a failed engine, is biased such that the display thereof is blanked out. The display of cockpit indicator 44 which relates to engine 12 simulating an operative engine in an actual OEI situation, is biased to indicate one or more of the various engine parameters including torque, NG, MGT and NPT, according to the total power values of the entire twin-engine power plant system 10, rather than the actual power level of engine 12. In particular, the biasing means 52 is adapted to add the amount of torque output of engine 14 to the amount of torque output of engine 12 such that the cockpit indicator 44 displays a total amount of torque output of the two engines. The biasing means 52 is also adapted to add an amount of the respective engine parameters NG and MGT equivalent to a power level provided by engine 14, to the amount of the corresponding engine parameters NG and MGT of engine 12 such that the cockpit indicator 44 is biased to display a total power level of the two engines.

As described above, aviation regulatory authorities and/or the engine manufactures, have established general over design criteria for the power plant system of a twin-engine helicopter such as the 30-second/2-minute maximum OEI power rating and the 2.5-minute maximum OEI power rating. Each set so-called OEI-limits on values of NG, MGT and torque, etc., up to which the engine can operate for a specified period of time before the engine deteriorates in performance below an acceptable level. Switching from one set of OEI limits to the other is completed by the pilot by selecting a switch. Engine expiry flags are used to provide indication that at least one OEI logic counter, used to count the occurrences of these events, has expired. The EECs 40 are adapted to control the cockpit indicators 44, 46 to display engine expiry flags alerting the pilot when he has used up any time allowance on the engine parameters NG, MGT or torque, in an actual OEI situation. In the engine operation mode the display of engine expiry flags is recorded in the non-violate memory (NVM) (not shown) installed in the EECs 40.

In order to realistically simulate OEI situations, the EECs 40 can display on the cockpit indicator 44 expiry flags to indicate expiry of the time allowance for the specified power limits, based on the combined total power of the two engines operated in the selected OEI training mode, when such time allowance for the power limit is used up. In other words, in the OEI training mode, the display of engine expiry flags for maximum OEI time allowance is not based on the true or actual value of engine parameters NG, MGT or torque of engine 12, but on the biased value of the corresponding parameters to better simulate an actual. OEI situation. However, simulated engine expiry flags are preferably not recorded as if they were real engine expiry flags incurred in actual OEI operation.

Modifications and improvements to the above-described embodiments of the present invention may become apparent to those skilled in the art. For example, though a dual-communicating-EEC system is described, any suitable combination of controller or controllers and associated control logic may be used to achieve a system capable of performing the described simulation method. The skilled reader will understand that the above description is somewhat schematic and descriptive in nature, and the function and operation of individual components of an actual system may vary from that described above. For example, features described as distinct above may be incorporated, and conversely, features described as integrated may instead be separate. Though described in respect of a twin-engine system, any multi-engine system may be present. The foregoing description is therefore intended to be exemplary rather than limiting. The scope of the present invention is therefore intended to be limited solely by the scope of the appended claims.

We claim:

1. A method of providing for simulation of a one-engine-inoperative (OEI) condition in a multi-engine helicopter, the method comprising the steps of
providing a OEI training program in a control system such that the control system is adapted to control the engines in an engine normal operation mode and in an OEI training mode; and
providing a selector for selection of the OEI training mode to allow the control system to control a plurality of engines in accordance with the following steps:
reducing a power level of all of the engines from a respective normal operational power level to a non-zero power level below the respective normal operational power level, the normal operational power level of an engine being the power level set prior to entering the OEI training mode; and then
increasing the power level of each of the engines from their respective non-zero power level to a respective power level higher than the respective non-zero power level, the increasing returning each engine, substantially to its respective normal operational power level after the step of increasing and while still in the OEI training mode, and wherein the power levels of the engine are thereby substantially equal to one another.

2. The method as claimed in claim 1 wherein the first non-zero value is higher than the second non-zero value.

3. The method as claimed in claim 2 wherein the step of reducing the respective power levels of the engines further comprises substantially simultaneously decelerating the second engine at a minimum fuel flow rate for one second and reducing a torque of the first engine at a 5 percent/sec rate for one second.

4. The method as claimed in claim 3 wherein the step of reducing the respective power levels of the engines further comprises limiting the deceleration of the second engine to a predetermined rate immediately after the one second deceleration thereof.

5. The method as claimed in claim 4 wherein the acceleration of the engines comprises accelerating the first engine immediately after the one second deceleration thereof.

6. The method as claimed in claim 1, wherein in the OEI training mode the control system performs a further step comprising:

biasing at least one display of a cockpit indicator relating to the respective engines to cause the display to appear as if only the first engine is operating.

7. The method as claimed in claim 6, wherein in the OEI training mode the control system performs a further step of:

providing to the cockpit indicator a simulated expiry flag indicating an expiry of a time allowance for a maximum OEI power limit, Wherein the simulated expiry flag is based on a combined total power of the two engines.

8. The method as claimed in claim 1, wherein the step of reducing the power levels comprises reducing the power levels of the engines at different rates relative to one another.

9. The method as claimed in claim 1, wherein the step of reducing the power levels comprises reducing the power levels of the engines for different durations relative to one another.

10. The method as claimed in claim 1, wherein the step of increasing the power levels comprises increasing the power levels of the engines at different rates relative to one another.

11. The method as claimed in claim 1, wherein the step of increasing the power levels comprises increasing the power levels of the engines for different durations relative to one another.

12. The method as claimed in claim 1, wherein the step of reducing the power levels comprises commencing reduction of the power levels of the engines simultaneously, and wherein the step of increasing the power levels comprises commencing increasing the power level of the first engine before commencing increasing the power level of the second engine, wherein the first engine is a simulated "good" engine.

13. The method as claimed in claim 12, wherein the increasing the power level of the second engine commences while the power level of the first engine continues to increase.

14. The method as claimed in claim 1, wherein the OEI condition comprises a simulated output power transient and the increasing of the power levels of each of the first and second engines occurs during said simulated output power transient.

15. The method as claimed in claim 14 wherein the transient comprises the simulated temporary total power loss and the increasing of the power levels of each of the first and second engines occurs during said simulated temporary total power loss.

16. A method for providing an engine controller configured for simulating a one-engine inoperative (OEI) condition in a multi-engine helicopter having at least first and second engines, the method comprising the steps of:

providing an engine controller with an OEI training program, the controller selectively switchable between a normal flight mode wherein the OEI training program is inactive and an OEI training mode wherein the OEI training program is active, the first and second engines being simulated "failed" and a "good" engines respectively in the OEI training mode, the OEI training program when active executing the steps of:

substantially simultaneously decelerating the first and second engines from respective first and second engine operational power settings, the engine operational power setting of each engine being the power setting used in the normal flight mode prior to switching to the OEI training mode;

terminating the deceleration of the first engine at a first non-zero power setting;

terminating the deceleration of the second engine at a second non-zero power setting which is lower than the first non-zero power setting;

accelerating the first engine, immediately after the first engine reaches the first non-zero power setting, until the first engine reaches a predetermined power setting not substantially exceeding the first engine operational power setting; and accelerating the second engine, immediately after the second engine reaches the second non-zero power setting, until the second engine reaches a predetermined power setting not exceeding the second engine operational power setting.

17. The method as claimed in claim 16, wherein the predetermined power settings of the engines are substantially equal to the respective operational power settings of the engines used in normal flight prior to commencing simulating the OEI condition, and wherein the operational power settings of the engines are substantially equal.

18. The method as claimed in claim 16, wherein the step of decelerating comprises decelerating second engine for a longer time period than the first engine.

19. The method as claimed in claim 16, wherein the OEI condition comprises a simulated output power transient and the accelerating of each of the first and second engines occurs during said simulated output power transient.

20. The method as claimed in claim 19 wherein the transient comprises the simulated temporary total power loss and the accelerating of each of the first and second engines occurs during said simulated temporary total power loss.

21. An electronic engine controller having a memory encoded with a program for simulating a one-engine inoperative (OEI) condition in a multi-engine helicopter having at least first and second engines, the program comprising the steps of:

entering an OEI training mode by simultaneously decelerating the first and second engines from a respective normal mode power level of the engine to a respective non-zero power level of the engine below the normal mode power level, the normal mode power level of each engine being a power level set prior to entering the OEI training mode; and then while still in the OEI training mode, accelerating each of the first and second engines from its respective non-zero power level substantially back to its respective normal mode power level.

22. The electronic engine controller as claimed in claim 21, wherein the power levels of the engines are decelerated and accelerated at different rates relative to one another, and wherein the non-zero power level of the second engine is lower than the ion-zero power level of the first engine.

23. The electronic engine controller as claimed in claim 21, wherein the respective normal mode power levels in the step of accelerating are substantially equal to one another.

24. The electronic engine controller as claimed in claim 21, wherein the OEI condition comprises a simulated output power transient and the accelerating of each of the first and second engines occurs during said simulated output power transient.

25. The electronic engine controller as claimed in claim 24 wherein the transient comprises the simulated temporary total power loss and the accelerating of each of the first and second engines occurs during said simulated temporary total power loss.

* * * * *